Oct. 1, 1929. L. F. EDMUNDSON 1,729,933
HAY LOADER
Filed June 4, 1927 4 Sheets-Sheet 4
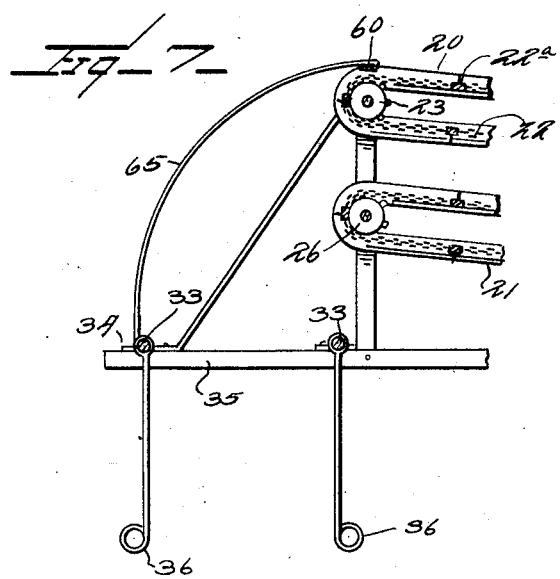
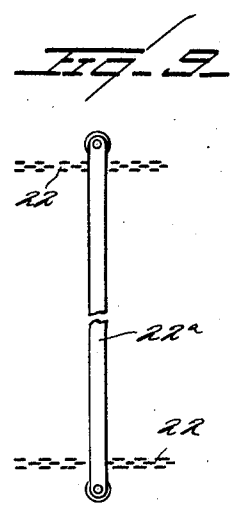
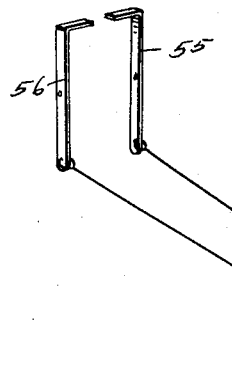
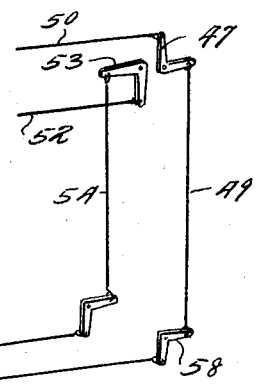
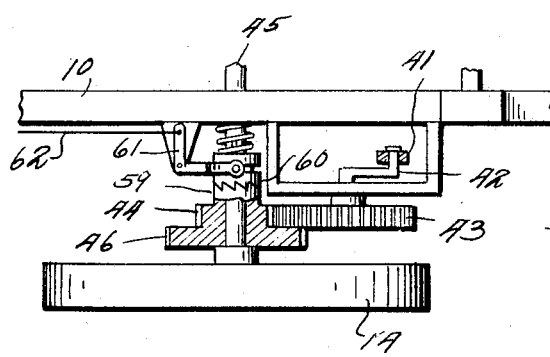
INVENTOR.
L. F. Edmundson
Watson E. Coleman
ATTORNEY.

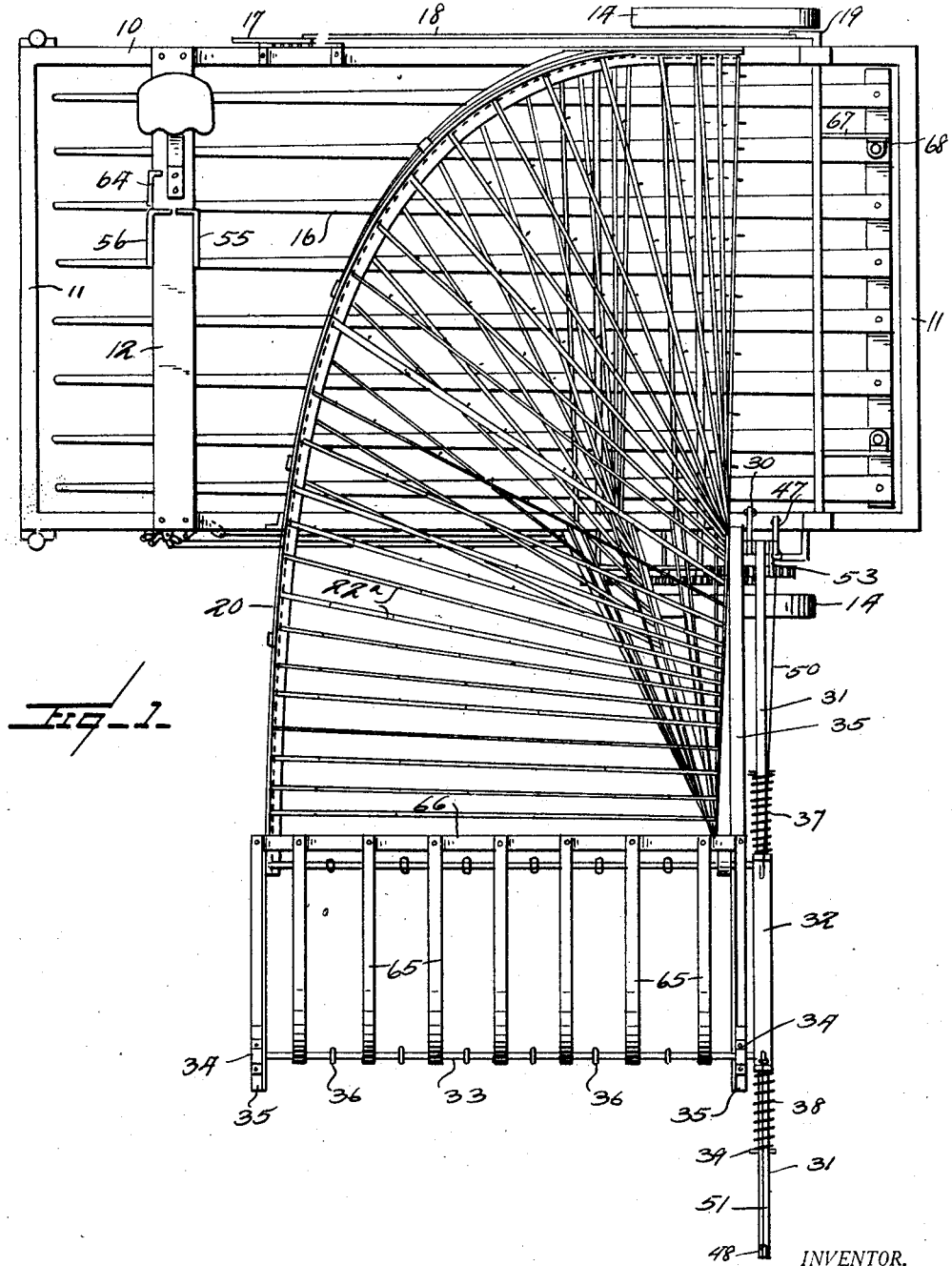

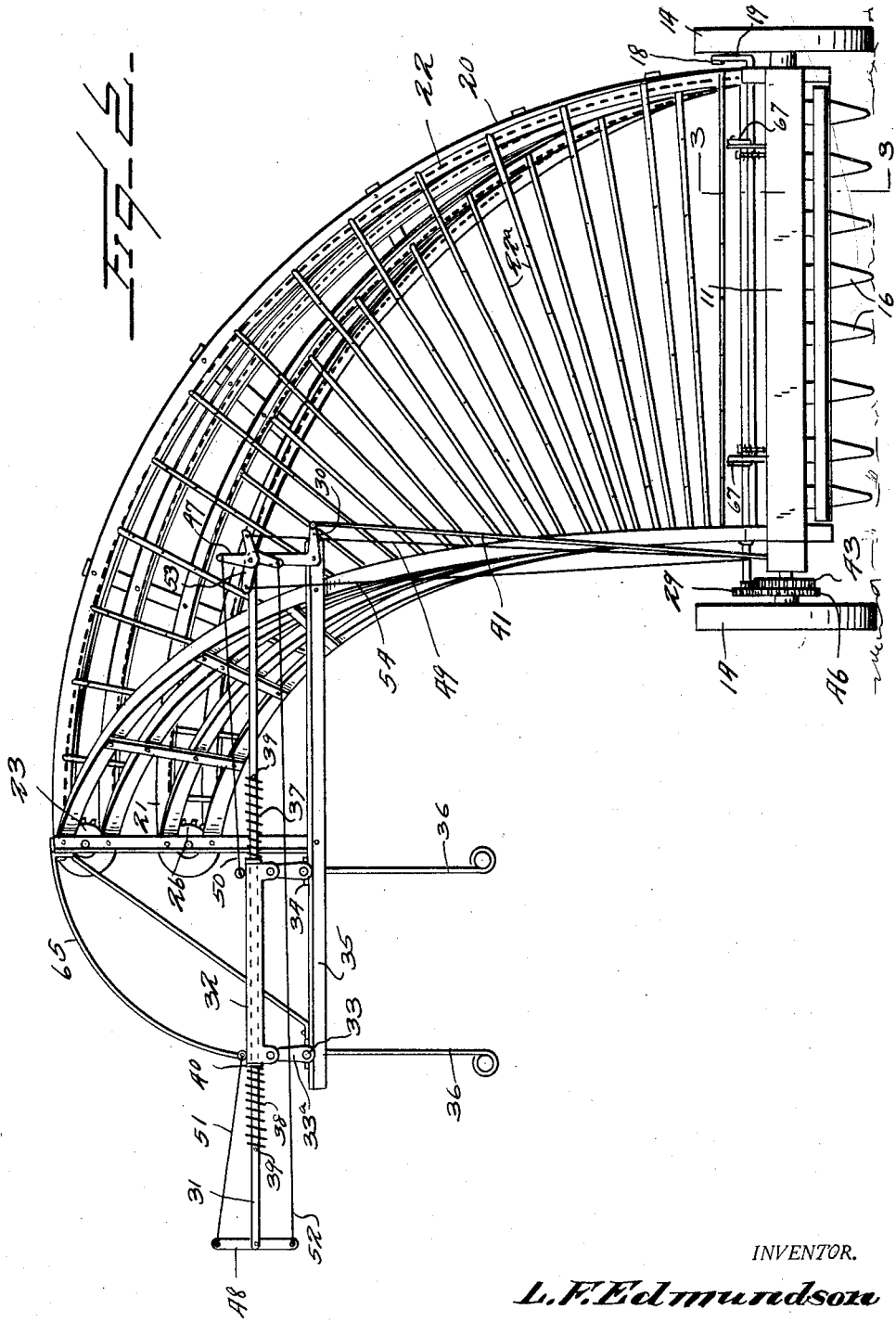

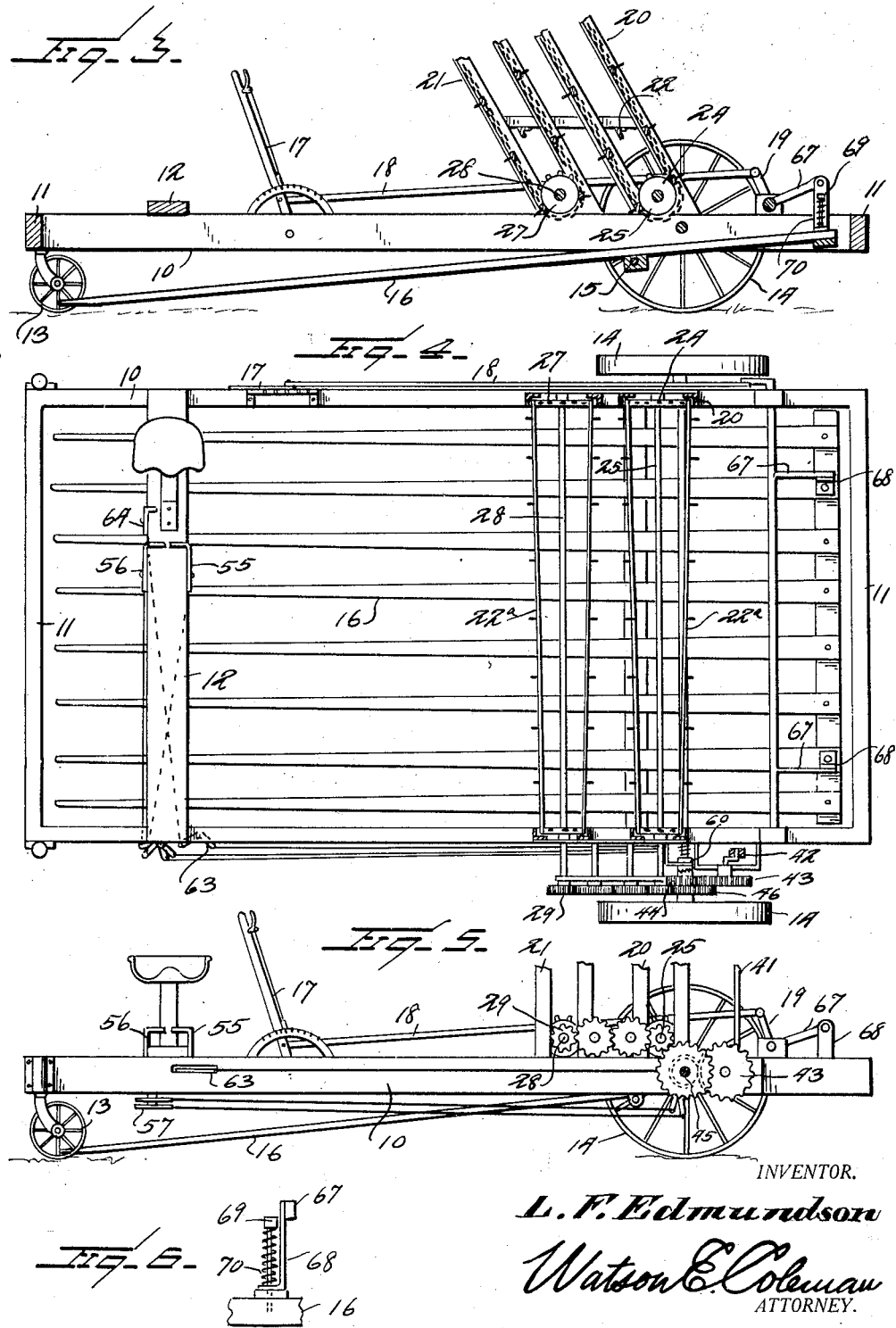

Patented Oct. 1, 1929

1,729,933

UNITED STATES PATENT OFFICE

LEWIS F. EDMUNDSON, OF PARMA, IDAHO

HAY LOADER

Application filed June 4, 1927. Serial No. 196,505.

This invention relates to hay loaders of that type in which a wheeled frame moves along with the hay barge or wagon, the frame carrying a vertically disposed elevator for lifting the hay from the rake and discharging it into the barge or wagon.

One of the objects of the present invention is to provide a hay loader in which the elevator supporting frame is constructed so as to form a partial spiral, said supporting frame and elevator at its lower end being transverse to the length of the rake and at its upper end extending longitudinally of the rake and extending beyond the supporting frame so as to discharge into the wagon or barge at the side of the supporting frame.

A further object is to provide means for causing the automatic discharge of the hay evenly and uniformly upon the receiving wagon.

Inasmuch as there is likely to be a constant variation in distance between the loader frame and the hay barge or wagon, another object is to provide manually operable means whereby the discharge guides for the hay may be shifted slightly to compensate for these variations in distance and in this connection provide means operated by the traction wheels of the loader which will cause the hay discharge guides to reciprocate across the wagon to thus distribute the hay.

Other objects will appear in the course of the following description.

My invention is illustrated in the accompanying drawings, wherein:—

Figure 1 is a top plan view of a hay loader constructed in accordance with my invention;

Figure 2 is a front elevation thereof;

Figure 3 is a fragmentary longitudinal section;

Figure 4 is a horizontal section;

Figure 5 is a side elevation;

Figure 6 is a detail view of the means for supporting the rake teeth;

Figure 7 is a fragmentary section of the upper end of the elevator and the discharge beams therefor;

Figure 8 is a sectional view of the driving mechanism;

Figure 9 is a fragmentary plan view of the conveyor chains and one of the spacing rods therefor;

Figure 10 is a diagrammatic illustration of the controlling pedals and their connections.

In these drawings, there is illustrated a wheel supported frame comprising the longitudinal members 10 and the transverse members 11. This frame may be constructed in any suitable manner and I do not wish to be limited to the exact construction illustrated.

At the forward end of the frame there is disposed a cross beam 12 carrying a seat. The forward end of the frame may be supported upon the wheels 13 and the rear end upon the traction wheels 14, which traction wheels through suitable gearing operate the elevator and other parts, as will be later described. Controlled by a transverse rock shaft 15 is a buck rake, designated generally 16, and having any ordinary or suitable construction, the forward end of the rake teeth normally inclining downward. This rock shaft may be shifted by means of a lever 17 connected by a link 18 and crank arm 19 to the rock shaft. This lever 17 operates over any suitable sector so that it may be locked in either a raised or lowered position. When the rake is lowered and the machine is drawn over the ground by the team or other draft appliance, the rake teeth will gather up the hay and the hay will collect at the back part of the rake. The rake is held lowered and the loader driven at the side of a hay barge out of which the hay is to be discharged.

Mounted upon the rear end of the frame or in any other suitable position thereon is the elevator frame. This consists of two oppositely disposed pairs of angular channel irons 20 and 21 which extend upwardly and laterally in a spiral curve so that while the inlet opening beneath the frame bars 20 and 21 is disposed transversely of the longitudinal axis of the machine, the discharge end of this frame is disposed parallel to said longitudinal axis. These frame bars or irons 20 and 21 are connected by transverse braces 22 or the frames may be otherwise braced in any suitable manner. The forward frame is, of course, to be spaced from the rear frame a distance sufficient to permit hay to be carried up by the opposed elevator flights 22. These elevator flights are composed of chains or other flexible elements, such as cables, having transverse slats 22ª, these slats being provided with hooks, teeth or other like means whereby hay may be raised by the upwardly moving slats.

There are two sets of these chains or cables, one mounted upon the forward frame and one upon the rear frame, the inner flights, of course, traveling with each other, and the chains thus traveling reversely to each other. The chains act to lift the hay up between the frames and discharge the hay from the discharge mouth at the upper end of the elevator. The frame composed of the irons 20 carries at its upper end the sprocket wheels 23 over which the forward elevator chains pass and these same chains pass over the sprocket wheels 24 carried upon a shaft 25 mounted adjacent the lower end of the frame. The rear elevator chains pass at the upper ends of their flights over the sprocket wheels 26 and at their lower ends pass around the sprocket wheels 27 mounted upon a shaft 28. The cross bars or slats 22ª have rollers at their extreme ends engaging the angle irons 20 and 21.

I do not wish to be limited to any particular arrangement of these sprocket wheels nor to the exact arrangement of the sprocket chains nor to the use of chains, as other flexible connections might be used and other guiding and driving means used. The purpose of the elevator chains is, of course, to engage the hay at the lower end of the elevator, carry it upward, and discharge it at the mouth of the elevator. These shafts 25 and 28 carry at their ends the pinions 29 which are engaged by intermeshing gear wheels driven in any suitable manner from the traction wheels 14, as will be later described. Any suitable gearing may be used for this purpose, however.

Mounted upon the inside frame adjacent its upper end is a bell crank 30, and pivotally connected to the free end of this bell crank is a longitudinally shiftable rod 31. This rod passes through a sleeve 32 which has swinging engagement with arms 33ª of two rock shafts 33. These rock shafts are mounted in bearings 34 on the longitudinally extending angle irons 35 which are attached to the frame of the machine. These rock shafts, therefore, extend transversely across the discharge end of the supporting frame and it is downward between these rock shafts that the hay is discharged.

Mounted upon these rock shafts in a depending position but oscillatable therewith are the fingers 36, which fingers at their lower ends are outwardly curved and may be weighted. These fingers oscillate with the rock shafts. Mounted upon the rod 31 at each side of the sleeve 32 are the coiled compression springs 37 and 38. These springs at their outer ends bear against the collars 39 which are held in place by set screws on the rod 31, and the ends of the sleeve are formed with heads 40 which bear against the inner ends of the springs.

It will thus be seen that as the rod 31 is reciprocated by means of the bell crank lever 30, the sleeve 32 will be reciprocated and this will oscillate the rock shafts 33 and thus swing the fingers transversely in one direction or the other to thus spread the hay. The springs 38 normally center this sleeve 32 upon the rod 31 and, of course, operate to cause the sleeve 32 to reciprocate with rod 31. The rod 31 is reciprocated to an extent such that the hay will be distributed for the full width of the wagon by means of the bell crank 30 heretofore referred to, which bell crank is connected by a link 41 with a crank 42. This crank is carried by a gear wheel 43 mounted in suitable bearings on the main frame of the machine. This gear wheel 43 in turn is driven by a pinion 44 mounted upon a shaft 45 having a gear wheel 46, this gear wheel being operatively driven from the traction wheel of the machine. The gearing is such that the rod 31 is given a complete reciprocation for each eight feet of travel of the wheel frame and thus the hay discharged from the elevator is uniformly distributed laterally upon the wagon or barge.

It often happens, as previously stated, that due to irregularities in the field over which the barge is traveling or for some other reason, the barge or wagon does not keep the same distance at all times from the frame of the loader and it is necessary to compensate for this, as otherwise the hay would not be evenly distributed and might be discharged over the sides of the wagon or barge. To this end, I mount upon the ends of the rod 31 the levers 47 and 48. The lever 47 is a bell crank lever and is connected to operating mechanism, as will be later stated, by a chain, link or other flexible connection 49. This lever 47 is connected by a chain or flexible connection 50 to the sleeve 32 adjacent one end, while the opposite end of the sleeve is connected by a connection 51 to the lever 46. Connected to the opposite end of this lever 48 is a wire, chain or other like connection 52 which extends longitudinally of the sleeve 32 and parallel thereto and is connected to a bell crank lever 53 from which a flexible connection 54 extends. These bell crank levers 47 and 53 are mounted upon the rod 31.

It will be obvious now that when the connection 49 is pulled, the sleeve 32 will be shifted toward the right in Figure 2 against the action of spring 37 at that end and that when the connection 52 is pulled the lever 47 will be oscillated and the connection 51 will draw the sleeve 32 in the opposite direction against the spring 38. Thus the sleeve 32 may be shifted and this will oscillate the rock shafts 33 and the fingers 34.

The means for shifting these connections 49 and 54 comprise the levers or pedals 55 and 56 which are mounted upon the beam 13 immediately adjacent to or in front of the driver's seat, it being remarked that the driver's seat faces toward the side of the wheel frame so that the driver may at all times observe the operation of the loader and operate these pedals to shift the rock shafts and thus manually shift or control the direction of the fingers 34. The lever 56 is connected by means of the bell cranks 57 and 58 to the flexible connection 49. Thus the operator by depressing one or the other of these pedals may shift the hay guides so as to compensate for any change in the proper distance between the hay barge and the loader, and when pressure is relieved upon both of these pedals, the springs 38 will cause the sleeve 32 to return to its initial position. The shaft 45 is driven by the traction wheels of the machine and the gear wheel 46 is loose upon this shaft 43 and is provided with a clutch member 59. This clutch member confronts a second clutch member 60 mounted upon the shaft 45 for longitudinal movement along this shaft into or out of engagement with the clutch member 59. The clutch member 60 is shifted by means of the shifting lever 61, which in turn is operated by means of a link or cable 62, a bell crank lever 53, and a foot pedal 64. This may be either in the form of a lever or of a pedal and is disposed adjacent the driver's seat. When this pedal is depressed or the lever shifted, the clutch will be thrown out and when released the clutch will be thrown in as, for instance, by means of a spring. Thus the driver of the machine at any time may stop the movement of the elevators and of the finger oscillating means which is, of course, necessary when the loader is traveling.

An upwardly bowed shield is carried above the discharge end of the loader, this shield being composed of the upwardly bowed strips 65 connected by longitudinal strips 66. This shield at its upper end is disposed just above the upper end of the forward flight of the elevator and the lower ends of these strips 65 are connected to the outer rock shaft 33. This shield guides the hay into position between the rock shafts 33 and prevents the hay from falling over the tops of these rock shafts. I do not wish to be limited to any particular means for supporting or constructing this shield.

Preferably the rake teeth of the buck rake 16 are so mounted that they shall be yieldingly supported, and to this end the rock shaft 15 has outwardly projecting arms 67 and links 68 depending from these arms and angularly bent at their lower ends. Vertical pins 69 pass through these angularly bent ends of the links 68, and coiled compression springs 70 bear at their upper ends against the upper ends of the pins and at their lower ends against these angularly extended ends of the links so that there is a cushioning medium between the rock shaft arms and the rake teeth which will permit slight oscillations of the rake teeth due to irregularities in the ground without affecting the rock shaft or the lever whereby the rock shaft is operated to depress or raise the rake teeth.

The operation of this mechanism will be obvious from what has gone before. The rake is used to accumulate a sufficient amount of hay upon the main frame and while the main frame is moving in a position parallel to the barge or wagon. The clutch 60 is shifted to engage the traction wheels with the operating mechanism of the elevator and loader and the elevator raises the hay and discharges it laterally onto the barge, the operator by means of the pedals 55 and 56 controlling the discharge of the load onto the barge so as to make the loading uniform and compensate for the varying distance between the barge and the loader.

While I have illustrated a mechanism which I believe to be particularly effective for the purpose, I do not wish to be limited to the details thereof as these may be varied in many ways without departing from the spirit of the invention. Obviously the gearing will be of a size and ratio suitable to secure the results desired. This device will evenly load the hay upon the barge and distribute the hay properly thereon.

I claim:—

1. A hay loader including a wheel supported frame, an elevator frame extending at its lower end transversely across the supporting frame and at its upper end extending parallel to the supporting frame and beyond the same, the elevator frame forming a part of a spiral, opposed endless elevators mounted upon the frame, the inner flights of which move in the same direction, traction wheel operated means for driving said elevators, and means at the upper end of the elevator frame positively directing the hay downward onto a hay barge, said directing means being shiftable in a plane at right angles to the length of the main frame to thereby distribute the hay upon the hay barge, and means for automatically shifting said directing means as the frame moves over a field.

2. A hay loader including a wheel supported frame having a buck rake, an elevator frame mounted at the butt end of the buck rake and extending upwardly and laterally, the upper end of the elevator frame extending beyond the under side of the wheel supported frame and being disposed parallel thereto, opposed endless elevators mounted upon the elevator frame, means for driving said endless elevators so as to carry the inner flights of the endless elevators upward and discharge the hay at the mouth of said frame, means at the mouth of the frame for guiding the hay discharged from the elevators downward onto a hay barge, traction wheel operated means for shifting said guiding means in a direction toward or away from the wheel supported frame to thus distribute the hay evenly upon the hay barge, and manually operable means for shifting said hay guiding means to compensate for variations in the proximity of the wheel supported frame to the hay barge.

3. A hay loader of the character described, including a wheel supported frame, an elevator frame mounted upon the wheel supported frame and consisting of opposed sets of angle irons, braces connecting the sets of angle irons, the elevator frame being twisted in its length so that the lower portion is disposed transverse to the longitudinal axis of the wheel supported frame and the upper portion parallel to the longitudinal axis thereof and extending beyond the side of the same, opposed endless elevators mounted upon the elevator supporting frame, each elevator consisting of opposed flexible endless members operating within the angle irons of the frame, transverse slats connecting each pair of endless members and having wheels at their extremities bearing against the angle irons of the frame, the slats having projecting prongs to engage the hay, means for driving the endless elevators from the traction wheels of the machine, and means at the upper end of the elevator frame for discharging and guiding the hay downward onto a barge.

4. A hay loader of the character described including a wheel supported frame, an elevator frame mounted upon the wheel supported frame and consisting of opposed sets of angle irons, braces connecting the sets of angle irons, the elevator frame being twisted in its length so that the lower portion is disposed transverse to the longitudinal axis of the wheel supported frame and the upper portion parallel to the longitudinal axis thereof and extending beyond the side of the same, opposed endless elevators mounted upon the elevator supporting frame, each elevator consisting of opposed flexible endless members operating within the angle irons of the frame, transverse slats connecting each pair of endless members and having wheels at their extremities bearing against the angle irons of the frame, the slats having projecting prongs to engage the hay, means for driving the endless elevators from the traction wheels of the machine, means at the upper end of the elevator frame for discharging and guiding the hay downward onto a barge including a pair of parallel rock shafts disposed at the upper end of the elevator frame and extending parallel to the longitudinal axis of the unloader, said shafts having depending fingers, means for guiding the hay ejected from the elevators into the space between said rock shafts, and means for oscillating said rock shafts to swing the fingers toward or from the unloader.

5. A hay loader including a supporting frame, an elevator frame extending at its lower end transversely across the supporting frame and at its upper end extending parallel to the supporting frame and beyond the same, the elevator frame forming a part of a spiral, opposed endless elevators mounted upon the frame, the inner flights of which move in the same direction, means at the upper end of the elevator frame for discharging and guiding the hay downward onto a barge including a pair of parallel rock shafts disposed at the upper end of the elevator frame and extending parallel to the longitudinal axis of the unloader, said shafts having depending fingers, means for guiding the hay ejected from the elevators into the space between said rock shafts, means for oscillating said rock shafts to swing the fingers toward or from the unloader including a sleeve having a cranked connection to the rock shafts, a rod extending through the sleeve, springs mounted upon the rod and disposed one on each side of the sleeve and causing the sleeve to shift with the rod but permitting independent movement of the sleeve, means connected to the traction wheels of the machine for reciprocating said rod, and manually operable means for shifting the sleeve in one direction or the other upon the rod.

6. A hay loader including a supporting frame, an elevator frame extending upward from the supporting frame and at its upper end extending parallel to the supporting frame and beyond the same, opposed endless elevators mounted upon the frame, the inner flights of which move in the same direction, means at the upper end of the elevator frame for discharging and guiding the hay downward onto a barge including a pair of parallel rock shafts disposed at the upper end of the elevator frame and extending parallel to the longitudinal axis of the unloader, said shafts having depending fingers, means for guiding the hay ejected from the elevators into the space between said rock shafts, means for oscillating said rock shafts to swing the fingers toward or from the unloader including a sleeve having a cranked connection to the rock shafts, a rod extending through the sleeve, springs mounted upon the rod and disposed one on each side of the sleeve and causing the sleeve to shift with the rod but permitting independent movement of the sleeve, means connected to the traction wheels of the machine for reciprocating said rod, manually operable means for shifting the sleeve in one direction or the other upon the rod including levers mounted at opposite ends of the rod, flexible connections extending from said levers to the sleeve, operating devices upon the wheel supported frame, and operative connections from said devices to said levers.

7. A hay unloader of the character described including a wheel supported frame, a buck rake mounted upon the frame and having depressible teeth, an operator's seat mounted upon the frame and facing toward one side of the frame, means for depressing said teeth, an elevator frame mounted upon the unloader and extending spirally upward and discharging parallel to the longitudinal axis of the unloader, endless elevator elements mounted upon said frame and including transverse slats having hay-engaging prongs whereby the hay is elevated upward on the frame and discharged at the top thereof, automatically operated means for guiding and shifting the hay transversely of the longitudinal axis of the supporting frame so as to distribute the hay upon the loader, manually operable means controlled from the operator's seat for shifting said guiding means toward or away from the unloader frame to thus compensate for changes in relation between the unloader and the hay barge onto which it is discharged, and means for operatively disconnecting the elevator and the hay guide operating means from the traction wheels of the machine or connecting said parts thereto.

8. A hay unloader including a supporting frame having traction wheels, a buck rake mounted upon the frame, means for raising or lowering the forward end of the buck rake, an elevator frame mounted upon the wheel frame and extending upwardly and laterally in a spiral and having its upper end disposed beyond the side of the wheel supported frame, the elevator frame being formed to provide two pairs of guides on each side of the elevator frame, endless elements traveling over these guides, the endless elements on one side being connected to the corresponding endless elements on the other side of the frame, wheels engaging the endless elements and causing the travel of the same, means for transmitting motion from the traction wheels to said endless elements including a clutch, means at the upper end of the frame for causing the downward discharge of hay, and means operated by the traction wheels of the machine for shifting said distributing means automatically toward or from the wheel supported frame as the loader moves along the ground.

In testimony whereof I hereunto affix my signature.

LEWIS F. EDMUNDSON.